(12) United States Patent
Chen (10) Patent No.: US 9,821,449 B2
(45) Date of Patent: Nov. 21, 2017

(54) FILE HANDLE

(71) Applicant: A-TINA TOOLS CO., LTD., Taichung (TW)

(72) Inventor: Kun-Chen Chen, Taichung (TW)

(73) Assignee: A-TINA TOOLS CO., LTD., Taichung (TW)

( * ) Notice: Subject to any disclaimer, the term of this patent is extended or adjusted under 35 U.S.C. 154(b) by 226 days.

(21) Appl. No.: 14/886,791

(22) Filed: Oct. 19, 2015

(65) Prior Publication Data

US 2017/0106526 A1    Apr. 20, 2017

(51) Int. Cl.
*B23D 71/00* (2006.01)
*B25G 3/24* (2006.01)
*B23D 71/04* (2006.01)

(52) U.S. Cl.
CPC .............. *B25G 3/24* (2013.01); *B23D 71/04* (2013.01)

(58) Field of Classification Search
CPC ........ B23D 71/04; B23D 71/06; B23D 71/08; B23D 71/10; B23D 71/00
See application file for complete search history.

(56) References Cited

U.S. PATENT DOCUMENTS

| | | | | |
|---|---|---|---|---|
| 1,442,469 A | * | 1/1923 | Dooley ................. | B23D 63/10 76/36 |
| 1,785,754 A | * | 12/1930 | Werner ................. | B27G 17/04 30/171 |
| 2,588,162 A | * | 3/1952 | Riggio ................. | B23D 51/01 279/81 |
| 2,642,907 A | * | 6/1953 | Alexander ............ | B25G 1/00 81/177.4 |
| 2,676,811 A | * | 4/1954 | Kindley ................ | B25G 1/00 279/123 |
| 2,737,704 A | * | 3/1956 | Cinocca ............... | B23D 51/10 279/76 |
| 2,738,568 A | * | 3/1956 | Civitelli ............... | B23D 71/00 407/29.14 |
| 3,080,653 A | * | 3/1963 | Dolin .................... | B26B 5/00 30/317 |
| 4,941,246 A | * | 7/1990 | Finnegan .............. | B23D 71/04 16/422 |
| 2009/0255380 A1 | * | 10/2009 | Tsai ..................... | B23D 71/04 81/177.4 |
| 2010/0162528 A1 | * | 7/2010 | Chen .................... | B25G 1/10 16/422 |

* cited by examiner

*Primary Examiner* — Will Fridie, Jr.
(74) *Attorney, Agent, or Firm* — Birch, Stewart, Kolasch & Birch, LLP (57) ABSTRACT

A file handle has a body, a ferrule, a clamping assembly, and a cap. The body has a first end and a second end opposite to the first end. The ferrule is assembled at the first assembling end of the body. The clamping assembly is movably mounted in the body and has two clamping portions and a threaded hole. The two clamping portions extend through the ferrule. The two clamping portions are subjected to an elastic force and oppositely separated from each other. The threaded hole is adjacent to the second assembling end of the body. The cap is rotatably assembled at the second assembling end of the body and has a screwing stick screwed in the threaded hole. Because the space between the two clamping portions can be adjusted by turning the cap, a user can clamp a tang of a file blade by the file handle.

9 Claims, 7 Drawing Sheets

FILE HANDLE

BACKGROUND OF THE INVENTION

1. Field of the Invention

The present invention relates to a handle, and more particularly to a file handle capable of being assembled with file blades in different specifications.

2. Description of Related Art

Figure 7:
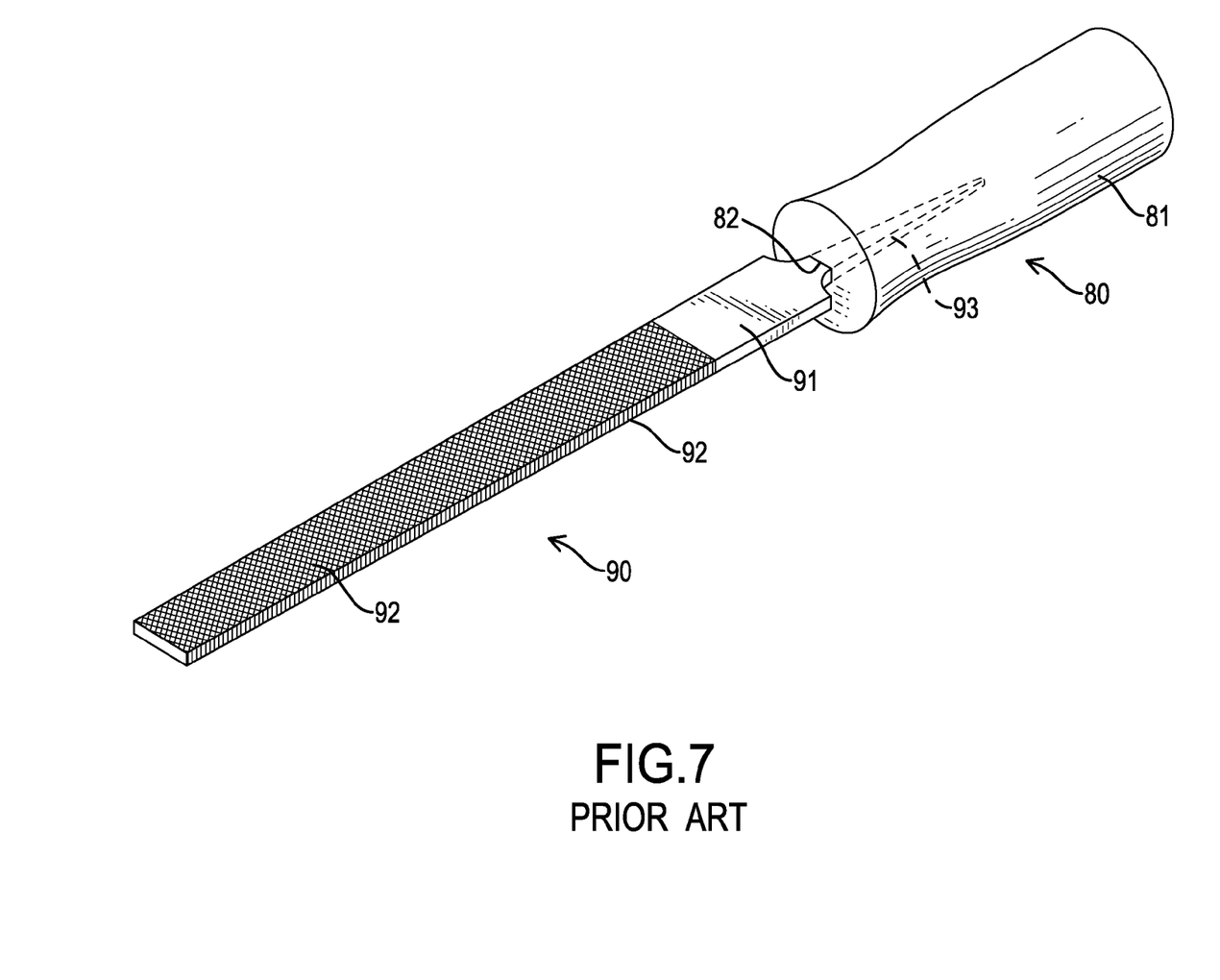
FIG. 7 is a perspective view of a conventional file.

A file is a hand tool for polishing or grinding a workpiece with uneven edges. With reference to FIG. 7, a conventional file comprises a handle 80 and a file blade 90. The handle 80 has a body 81 and an assembling hole 82. The body 81 is rod-like and has two opposite ends. The assembling hole 82 is disposed at one of the ends of the body 81 and is formed in the body 81. The file blade 90 has a flat bar 91, two abrasive faces 92, and a tang 93. The flat bar 91 has two opposite surfaces and two opposite ends. The two abrasive faces 92 are rough and are respectively disposed on the two surfaces of the flat bar 91. The two abrasive faces 92 may undergo a treatment of case-hardening to improve their hardness. The tang 93 is formed at one of the ends of the flat bar 91. The tang 93 is mounted in the assembling hole 82 of the handle 80. The two abrasive faces 92 has different degrees of surface roughness to be applied to different requirements.

The file blade 90 of the conventional file is fixed on the handle 80 and is irreplaceable. The user must prepare and carry multiple files with different surface roughnesses for different situations. The preparation and the carrying of the files bring the user a lot of trouble. More importantly, the user cannot change the file blade 90 when the two abrasive faces 92 are worn off and the worn-off file has to be discarded. The disposal of the handle 80 causes a waste of resources.

To overcome the shortcomings of the conventional file, the present invention provides a handle to mitigate or obviate the aforementioned problems.

SUMMARY OF THE INVENTION

The main objective of the present invention is to provide a file handle capable of assembling with file blades in different specifications; the file handle facilitates easy replacement of file blades for different circumstances.

The file handle comprises a body, a ferrule, a clamping assembly, and a cap. The body has a first assembling end and a second assembling end opposite to the first end. The ferrule is assembled at the first assembling end of the body. The clamping assembly is movably mounted in the body and has two clamping portions and a threaded hole. The two clamping portions extend through the ferrule. The two clamping portions are subjected to an elastic force and oppositely separated from each other. The threaded hole is adjacent to the second assembling end of the body. The cap is rotatably assembled at the second assembling end of the body and has a screwing stick screwed in the threaded hole. Because the space between the two clamping portions can be adjusted by rotating the cap, a user can clamp a tang of a file blade by the file handle.

Other objects, advantages, and novel features of the invention will become more apparent from the following detailed description when taken in conjunction with the accompanying drawings.

DETAILED DESCRIPTION OF PREFERRED EMBODIMENT

Figure 1:
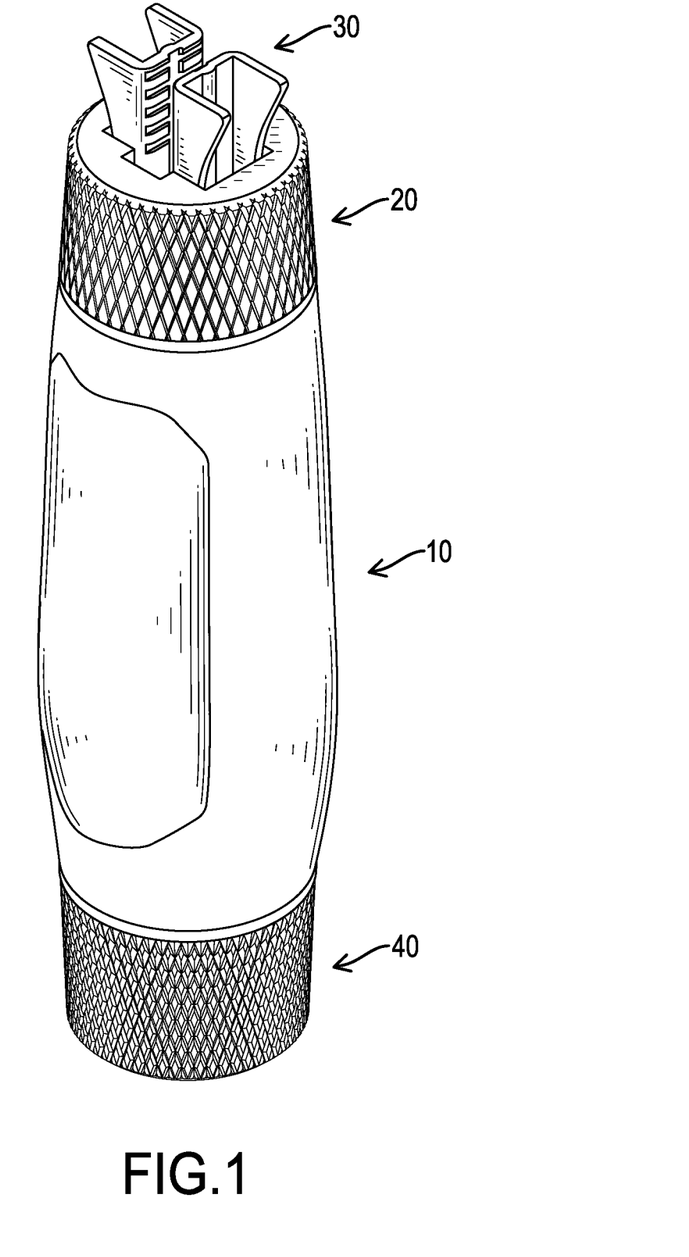
FIG. 1 is a perspective view of a file handle in accordance with the present invention.

With reference to FIG. 1, a file handle in accordance with the present invention comprises a body 10, a ferrule 20, a clamping assembly 30, and a cap 40. The body 10 has a first assembling end and a second assembling end. The first assembling end and the second assembling end are opposite each other. The ferrule 20 is assembled at the first assembling end of the body 10. The clamping assembly 30 is movably mounted in the body 10. The cap 40 is rotatably assembled at the second assembling end of the body 10.

Figure 2:
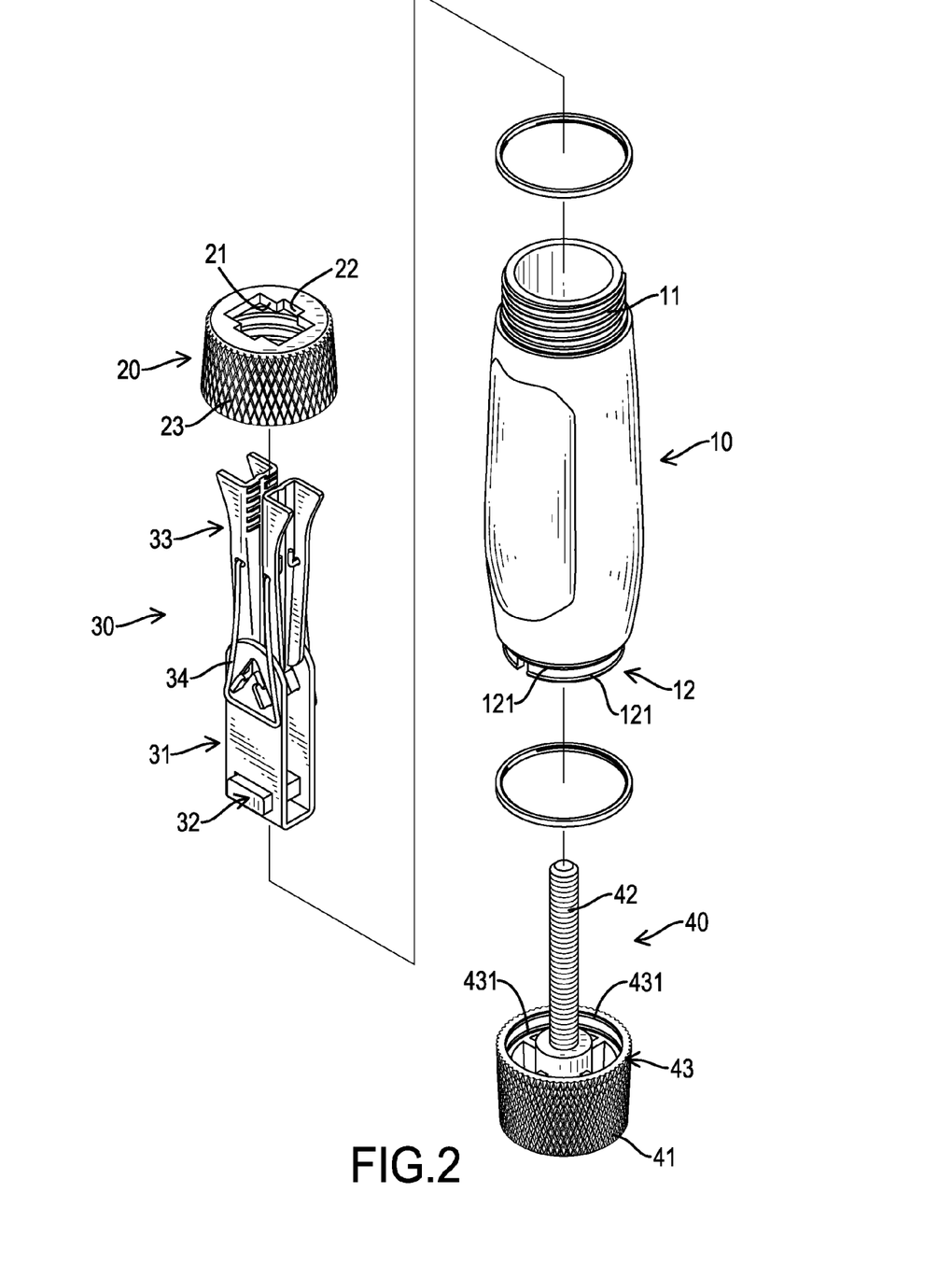
FIG. 2 is an exploded perspective view of the file handle in FIG. 1.
Figure 4:
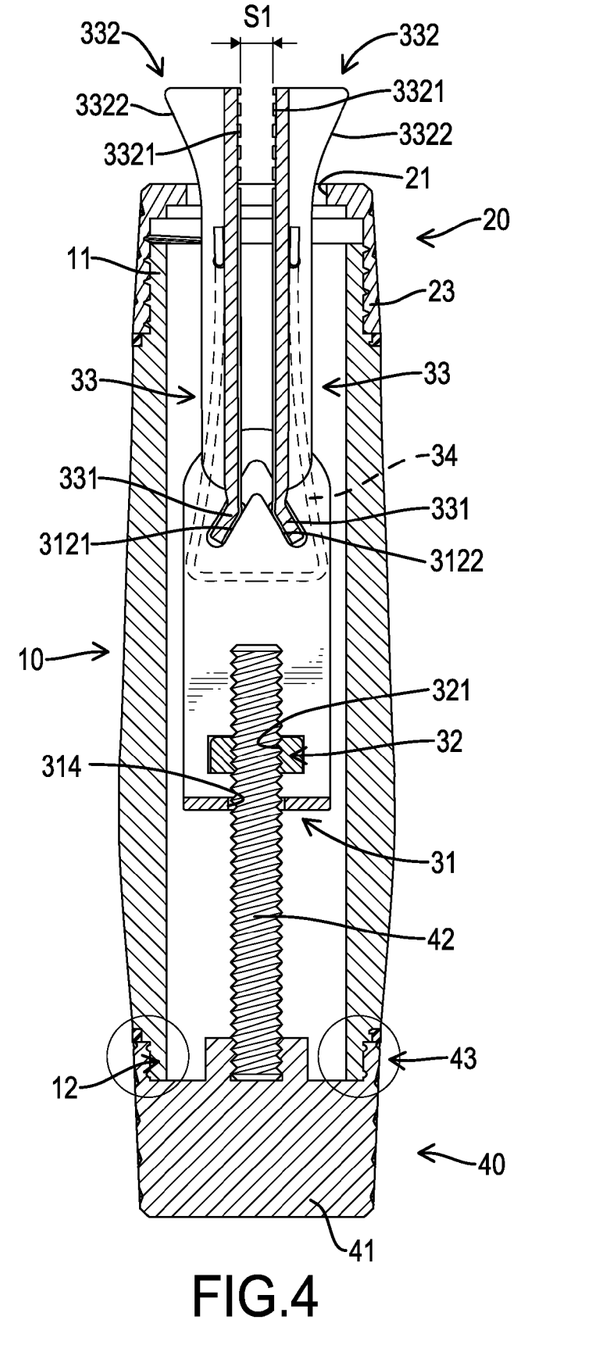
FIG. 4 is a cross sectional side view of the file handle in FIG. 1.

With reference to FIGS. 1, 2, and 4, the body 10 is tubular and has a first mounting portion 11 and a second mounting portion 12. The first mounting portion 11 is disposed at the first assembling end of the body 10. The first mounting portion 11 has an outer surface and an external thread. The external thread is formed on the outer surface of the first mounting portion 11. The second mounting portion 12 is disposed at the second assembling end of the body 10. The second mounting portion 12 has an outer surface and at least one blocking protrusion 121. The at least one blocking protrusion 121 is annular and is formed on the outer surface of the second mounting portion 12. With reference to FIG. 2 and FIG. 4, the at least one blocking protrusion 121 is implemented as two in amount.

With reference to FIGS. 1, 2, and 4, the ferrule 20 has a top plate, a constraining hole 21, two recesses 22, and a first assembling portion 23. The constraining hole 21 is defined through the top plate of the ferrule 20 and has two opposite sides. The two recesses 22 are respectively disposed at the two sides of the constraining hole 21 and communicate with the constraining hole 21. The first assembling portion 23 is connected with the top plate of the ferrule 20. The first assembling portion 23 is circular in section and has an inner surface and an inner thread formed on the inner surface of the first assembling portion 23. The first assembling portion 23 of the ferrule 20 is screwed with the first mounting portion 11 of the body 10. The inner thread of the first assembling portion 23 is engaged with the external thread of the first mounting portion 11.

Figure 3:
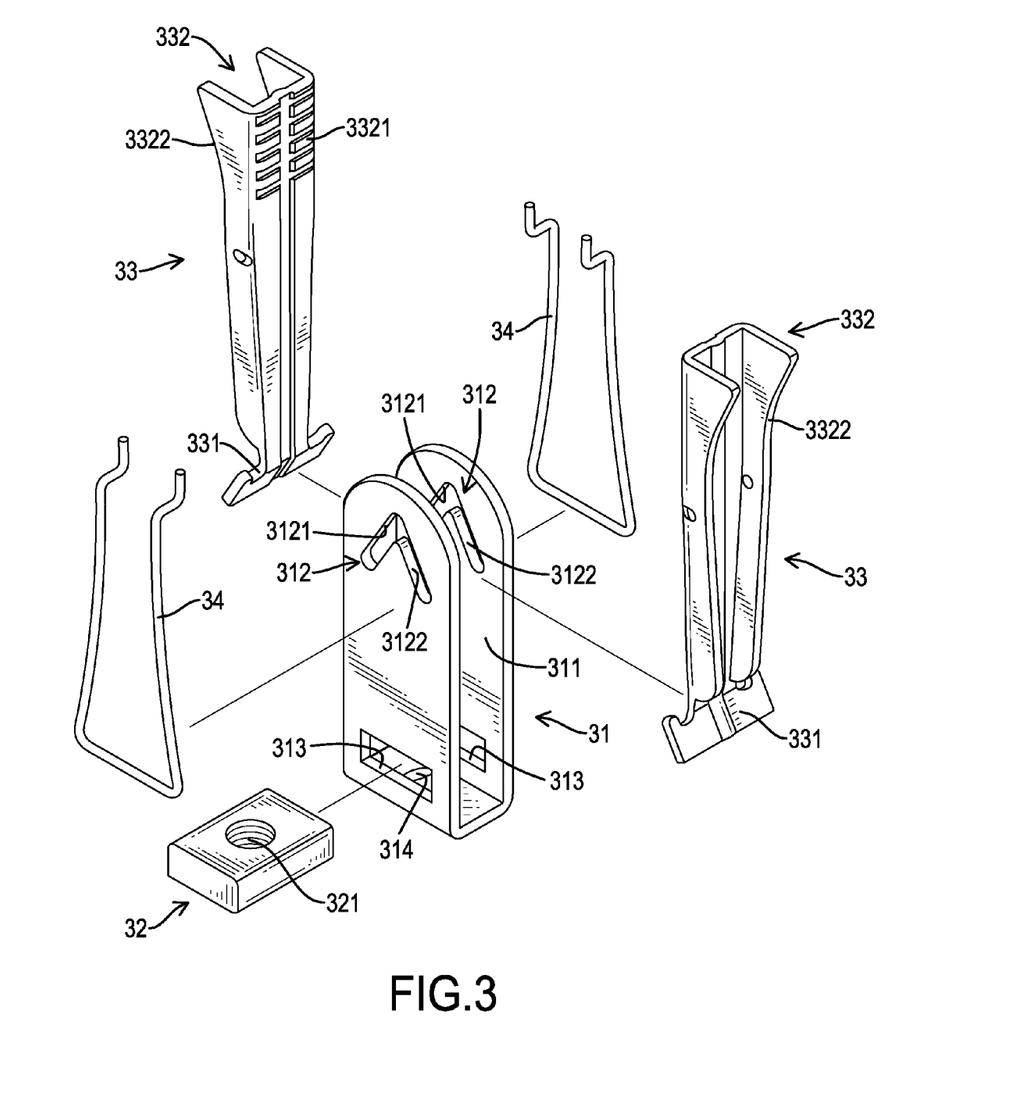
FIG. 3 is an enlarged exploded perspective view of the clamping assembly of the file handle in FIG. 1.

With reference to FIGS. 2, 3, and 4, the clamping assembly 30 is movably mounted in the body 10. The clamping assembly 30 has a first end, a second end, a connecting component 31, a screwing unit 32, two clamping components 33, and two elastic units 34. The first end of the clamping assembly 30 is adjacent to the first mounting portion 11. The second end of the clamping assembly 30 is adjacent to the second mounting portion 12.

With reference to FIGS. 2, 3, and 4, the connecting component 31 is mounted in the body 10 and is disposed at the second end of the clamping assembly 30. The connecting component 31 is U-shaped and has a joined end, two connecting arms 311, two connecting holes 312, two inserting holes 313, and a through hole 314. The joined end of the connecting component 31 faces to the second assembling end of the body 10. The two connecting arms 311 are connected with each other at the joined end of the connecting component 31. The two connecting holes 312 are inverted V-shaped and are respectively defined through the two connecting arms 311. Each connecting hole 312 is distal from the joined end of the connecting component 31 and has a first hollow portion 3121, a second hollow portion 3122, and a tip. The first hollow portion 3121 and the second hollow portion 3122 are joined together to from the tip. The tip of each connecting hole 312 faces to the first mounting portion 11 of the body 10. The two inserting holes 313 are respectively defined through the two connecting arms 311 and are adjacent to the joined end of the connecting component 31. The through hole 314 is defined through the joined end of the connecting component 31.

With reference to FIGS. 2, 3, and 4, the screwing unit 32 has a block that is rectangular in section and a threaded hole 321 defined through the rectangular block. The threaded hole 321 has an inner surface and an inner thread. The inner thread is formed on the inner surface of the threaded hole 321. The screwing unit 32 is inserted into the two inserting holes 313 of the connecting component 31.

With reference to FIGS. 2, 3, and 4, the two clamping components 33 are mounted in the body 10 and are disposed at the first end of the clamping assembly 30. Each clamping component 33 has a connecting portion 331, a clamping portion 332, a clamping face 3321, and an abutting face 3322. The connecting portion 331 and the clamping portion 332 are opposite each other. The connecting portion 331 of the clamping component 33 corresponds to the two connecting holes 312 of the connecting component 31 in shape. The clamping portion 332 has two opposite sides. The clamping face 3321 and the abutting face 3322 are disposed at the clamping portion 332 and are respectively formed on the two opposite sides of the clamping portion 332. The clamping face 3321 has multiple anti-slip grooves. The abutting face 3322 is inclined towards the connecting portion 331 and is curved.

With reference to FIG. 2 and FIG. 3, the connecting portion 331 of one of the clamping components 33 is movably mounted in the two first hollow portions 3121 of the two connecting holes 312. The connecting portion 331 of the other clamping component 33 is movably mounted in the two second hollow portions 3122 of the two connecting holes 312. The two clamping portions 332 of the two clamping components 33 are separated from each other. The two clamping faces 3321 of the two clamping portions 332 face to each other. The two abutting faces 3322 of the two clamping portions 332 respectively face to opposite directions.

With reference to FIGS. 2, 3, and 4, the two elastic units 34 may be same in structure. Each elastic unit 34 is U-shaped and has a joined portion and two fastening ends. The two fastening ends are distal from the joined portion. The two fastening ends of each elastic unit 34 are respectively fixed on the two clamping components 33 and are adjacent to the two clamping portions 332 of the two clamping components 33.

The clamping assembly 30 may also be formed as a single integrated part that is movably mounted in the body 10. The two clamping portions 332 are disposed at the first end of the clamping assembly 30 and extend through the constraining hole 21. The two clamping portions 332 are subjected to an elastic force and are oppositely separated from each other. The elastic force may be provided by the elasticity of the clamping assembly 30 and the two elastic units 34 may be omitted. The threaded hole 321 is disposed at the second end of the clamping assembly 30.

Figure 4A:
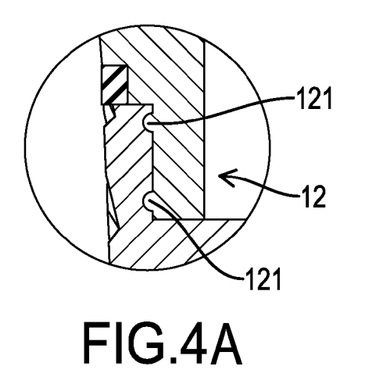
FIG. 4A is an enlarged partial section of the file handle in FIG. 4.
Figure 4B:
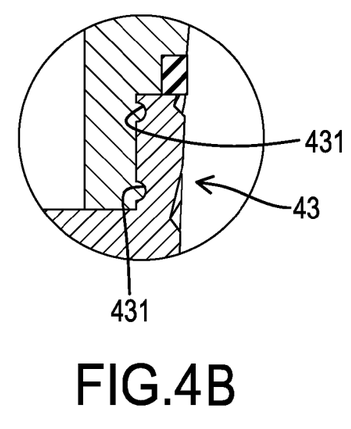
FIG. 4B is an enlarged partial section of the file handle in FIG. 4.

With reference to FIGS. 1, 2, and 4, the cap 40 has a cap body 41, a screwing stick 42 and a second assembling portion 43. The cap body 41 has a center. The screwing stick 42 is connected with the center of the cap body 41 and has an outer surface and an outer thread formed on the outer surface of the screwing stick 42. The second assembling portion 43 is circular in section. The second assembling portion 43 is connected with the cap body 41 and surrounds the screwing stick 42. The second assembling portion 43 has an inner surface and at least one groove 431 formed in the inner surface of the second assembling portion 43. The at least one groove 431 corresponds to the at least one blocking protrusion 121 in amount. With reference to FIGS. 2 and 4, the at least one groove 431 is implemented as two in amount. The cap 40 is assembled at the second assembling end of the body 10 and is opposite to the ferrule 20. The second assembling portion 43 is mounted on the second mounting portion 12 of the body 10. With reference to FIG. 4A and 4B, the two grooves 431 of the cap 40 are disposed around the two blocking protrusions 121 of the second mounting portion 12. The screwing stick 42 is inserted through the through hole 314 of the connecting component 31 and then screwed with the threaded hole 321 of the screwing unit 32. The outer thread of the screwing stick 42 is engaged with the inner thread of the threaded hole 321.

Figure 5:
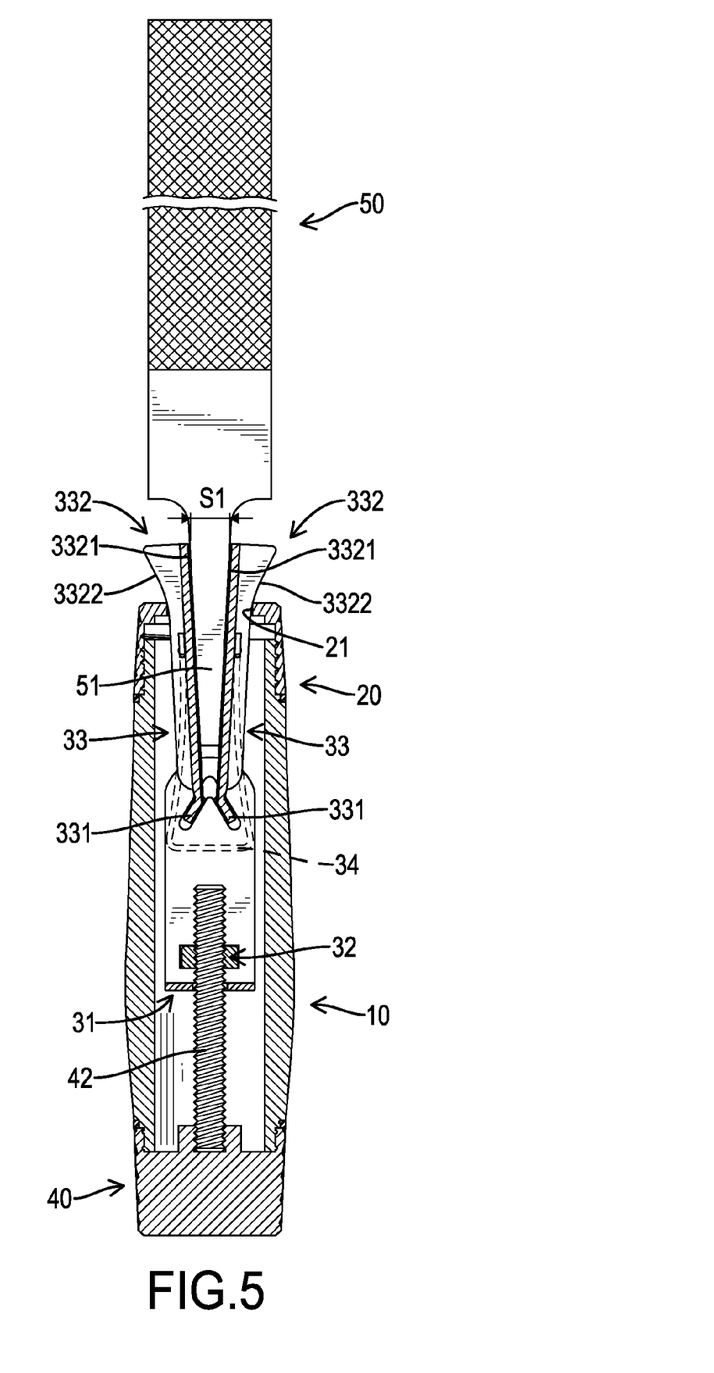
FIG. 5 is an operational side view in partial section of the file handle in FIG. 1.
Figure 6:
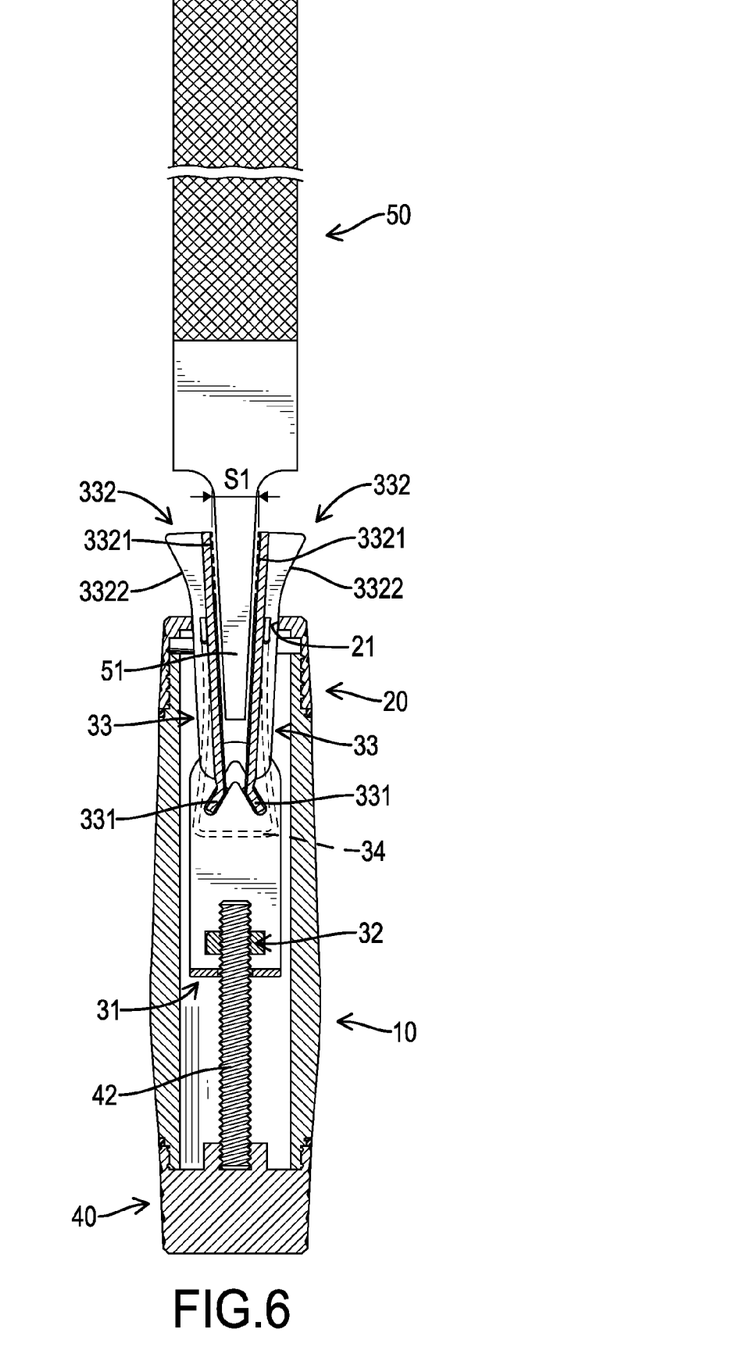
FIG. 6 is an operational side view in partial section of the file handle in FIG. 1.

With reference to FIGS. 4, 5, and 6, the file handle in accordance with the present invention can be utilized to clamp a file blade 50 with a tang 51. The tang 51 of the file blade 50 is inserted into a space Si between the two clamping portions 332, and then the cap 40 is rotated in one direction. The screwing unit 32 moves along the outer thread of the screwing stick 42 of the cap 40 and towards the cap 40. The screwing unit 32 pulls the connecting component 31, the screwing unit 32, and the two clamping components 33 to move towards the cap 40, and the two abutting faces 3322 of the two clamping components 33 abut against an edge of the constraining hole 21.

Since the two abutting faces 3322 are inclined towards the two connecting portions 331 of the two clamping components 33, the space Si between the two clamping portions 332 of the two clamping components 33 is getting smaller and smaller when the two clamping components 33 are pulled towards the cap 40. Eventually, the tang 51 of the file 50 is clamped between the two clamping portions 332. The multiple anti-slip grooves of the clamping faces 3321 can prevent the tang 51 from slipping out of the space S1 between the two clamping portions 332.

To change to another file blade 50, the cap 40 is rotated reversely. The elastic force that is provided by the two elastic units 34 is applied to the two clamping portions 332 of the two clamping components 33. The elastic force expands the two clamping portions 332 outwards and makes the space S1 between the two clamping portions 332 become larger to fit with a different file blade 50.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A file handle comprising:
   a body being tubular and having a first assembling end and a second assembling end, and the first assembling end and the second assembling end being opposite each other;
   a ferrule assembled at the first assembling end of the body and having a top plate and a constraining hole defined through the top plate of the ferrule;
   a clamping assembly movably mounted in the body and having
      a first end being adjacent to the first assembling end of the body;
      a second end being adjacent to the second assembling end of the body;
      two clamping portions disposed at the first end of the clamping assembly, extending through the constraining hole, subjected to an elastic force, oppositely separated from each other, and each respectively having an abutting face inclined towards the second assembling end of the body, wherein the two abutting faces of the two clamping portions face respectively to opposite directions; and
      a threaded hole disposed at the second end of the clamping assembly and having an inner surface and an inner thread formed on the inner surface of the threaded hole; and
   a cap rotatably assembled at the second assembling end of the body and having
      a cap body having a center; and
      a screwing stick connected with the center of the cap body and having
         an outer surface; and
         an outer thread formed on the outer surface of the screwing stick and engaging with the inner thread of the threaded hole.

2. The file handle as claimed in claim 1, wherein the clamping assembly further has
   a connecting component mounted in the body and disposed at the second end of the clamping assembly, wherein the connecting component is U-shaped and has
      a joined end facing to the second assembling end of the body;
      two connecting arms connected with each other at the joined end; and
      a screwing unit assembled on the connecting component and having a block and the threaded hole defined through the block;
   two clamping components mounted in the body, disposed at the first end of the clamping assembly, and each respectively having a connecting portion, and the two connecting portions respectively connected to the two connecting arms; and
   the two clamping portions are respectively formed on the two clamping components, and the clamping portion and the connecting portion of each clamping component are opposite each other.

3. The file handle as claimed in claim 2 further comprising two elastic units, wherein each elastic unit is U-shaped and has a joined portion and two fastening ends being distal from the joined portion; and
the two fastening ends of each elastic unit are respectively fixed on the two clamping components and are adjacent to the two clamping portions of the two clamping components.

4. The file handle as claimed in claim 3, wherein
the connecting component has
   two connecting holes respectively defined through the two connecting arms and being distal from the joined end of the connecting component; wherein
each one of the connecting holes is inverted V-shaped and has
   a first hollow portion;
   a second hollow portion; and
   a tip facing to the first assembling end; wherein
   the first hollow portion and the second hollow portion are joined together to form the tip; and
the connecting portion of one of the clamping components is movably mounted in the two first hollow portions of the two connecting holes; and
the connecting portion of the other clamping component is movably mounted in the two second hollow portions of the two connecting holes.

5. The file handle as claimed in claim 4, wherein the constraining hole has two opposite sides; and
   the ferrule further has two recesses respectively disposed at the two sides of the constraining hole and communicating with the constraining hole.

6. The file handle as claimed in claim 5, wherein the abutting face of each clamping portion is curved.

7. The file handle as claimed in claim 6, wherein the body has a first mounting portion disposed at the first assembling end of the body and having an outer surface and an external thread formed on the outer surface of the first mounting portion; and
   the ferrule has a first assembling portion connected with the top plate of the ferrule, being circular, and having an inner surface and an inner thread formed on the inner surface of the first assembling portion, and
   the inner thread of the first assembling portion is engaged with the external thread of the first mounting portion.

8. The file handle as claimed in claim 7, wherein
the body has
   a second mounting portion disposed at the second assembling end of the body and having
      an outer surface; and
      at least one blocking protrusion being annular and formed on the outer surface of the second mounting portion; and
the cap has a second assembling portion being circular, connected with the cap body of the cap, and surrounding the screwing stick of the cap; wherein the second assembling portion has
   an inner surface; and
   at least one groove formed on the inner surface of the second assembling portion and disposed around the at least one blocking protrusion.

9. The file handle as claimed in claim 8, wherein the at least one blocking protrusion is implemented as two in amount; and
the at least one groove is implemented as two in amount.

* * * * *